United States Patent
Weinl et al.

(10) Patent No.: US 11,143,299 B2
(45) Date of Patent: Oct. 12, 2021

(54) DEVICE FOR LOCKING A PISTON ROD OF A PISTON OF AN ACTUATOR WHICH IS PRESSURIZABLE IN ORDER TO DISENGAGE A PARKING LOCK AND IS SPRING-LOADED IN ORDER TO ENGAGE THE PARKING LOCK

(71) Applicant: ZF Friedrichshafen AG, Friedrichshafen (DE)

(72) Inventors: Florian Weinl, Bodolz (DE); Thomas Schwegler, Tettnang (DE); Maik Wiesner, Weingarten (DE); Dirk Leutheuser, Langenargen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/112,100

(22) Filed: Dec. 4, 2020

(65) Prior Publication Data
US 2021/0172521 A1 Jun. 10, 2021

(30) Foreign Application Priority Data
Dec. 5, 2019 (DE) .................. 10 2019 218 981.4

(51) Int. Cl.
*F16H 63/38* (2006.01)
*F16H 63/34* (2006.01)
*F16H 63/36* (2006.01)

(52) U.S. Cl.
CPC ......... *F16H 63/3458* (2013.01); *F16H 63/36* (2013.01); *F16H 63/38* (2013.01)

(58) Field of Classification Search
CPC ....... F16H 63/3458; F16H 63/36; F16H 63/38
See application file for complete search history.

(56) References Cited

U.S. PATENT DOCUMENTS

| 3,251,278 | A | * | 5/1966 | Royster | ................. | F15B 15/261 |
| | | | | | | 92/18 |
| 5,048,656 | A | * | 9/1991 | Braun | .................... | B60T 17/16 |
| | | | | | | 192/85.57 |
| 6,823,976 | B2 | | 11/2004 | Schmid | | |

(Continued)

FOREIGN PATENT DOCUMENTS

| DE | 10037565 A1 | 4/2002 |
| DE | 102012210571 A1 | 12/2013 |
| EP | 1960701 B1 | 6/2009 |

OTHER PUBLICATIONS

German Search Report DE 10 2019 218 981.4, dated Feb. 3, 2020. (10 pages).

*Primary Examiner* — David M Fenstermacher
(74) *Attorney, Agent, or Firm* — Dority & Manning, P.A.

(57) ABSTRACT

A device for locking a piston rod of a piston of an actuator is provided. An electrically actuatable electromagnet includes an armature rod, which is axially movable counter to a first preloading spring and on which two actuating elements are axially displaceably mounted between two stops of the armature rod. A second preloading spring is axially mounted between the two actuating elements. The actuating elements each include actuating contours, which are associated with latching mechanisms, via which the piston is mechanically fixable in a disengaged condition and in a engaged condition of the parking lock.

11 Claims, 6 Drawing Sheets

(56) References Cited

U.S. PATENT DOCUMENTS

| | | | |
|---|---|---|---|
| 7,025,188 B2* | 4/2006 | Lindenschmidt | F16H 63/3416 188/31 |
| 7,650,978 B2* | 1/2010 | Ruhringer | F16H 63/3433 192/219.6 |
| 7,861,839 B2* | 1/2011 | Schweiher | F16H 63/483 192/220.2 |
| 8,763,764 B2* | 7/2014 | Jang | B60T 17/221 188/31 |
| 8,844,703 B2* | 9/2014 | Jang | B60T 17/221 192/219.6 |
| 9,062,766 B2 | 6/2015 | Mayr | |
| 9,328,822 B2* | 5/2016 | Hill | B60T 1/062 |
| 9,383,012 B2* | 7/2016 | Popp | F16H 63/34 |
| 9,677,668 B2* | 6/2017 | Gunderson | F16H 63/3425 |
| 10,731,758 B2* | 8/2020 | Herrmann | F16H 63/3425 |
| 11,022,218 B2* | 6/2021 | Schwegler | F16H 63/3475 |
| 2005/0098400 A1* | 5/2005 | Kleinert | F16H 63/3433 188/300 |
| 2005/0103926 A1 | 5/2005 | Hawthorne | |
| 2011/0023647 A1* | 2/2011 | Engel | F16H 61/30 74/473.11 |
| 2015/0167843 A1* | 6/2015 | Schuller | F16D 63/006 192/219.4 |

* cited by examiner

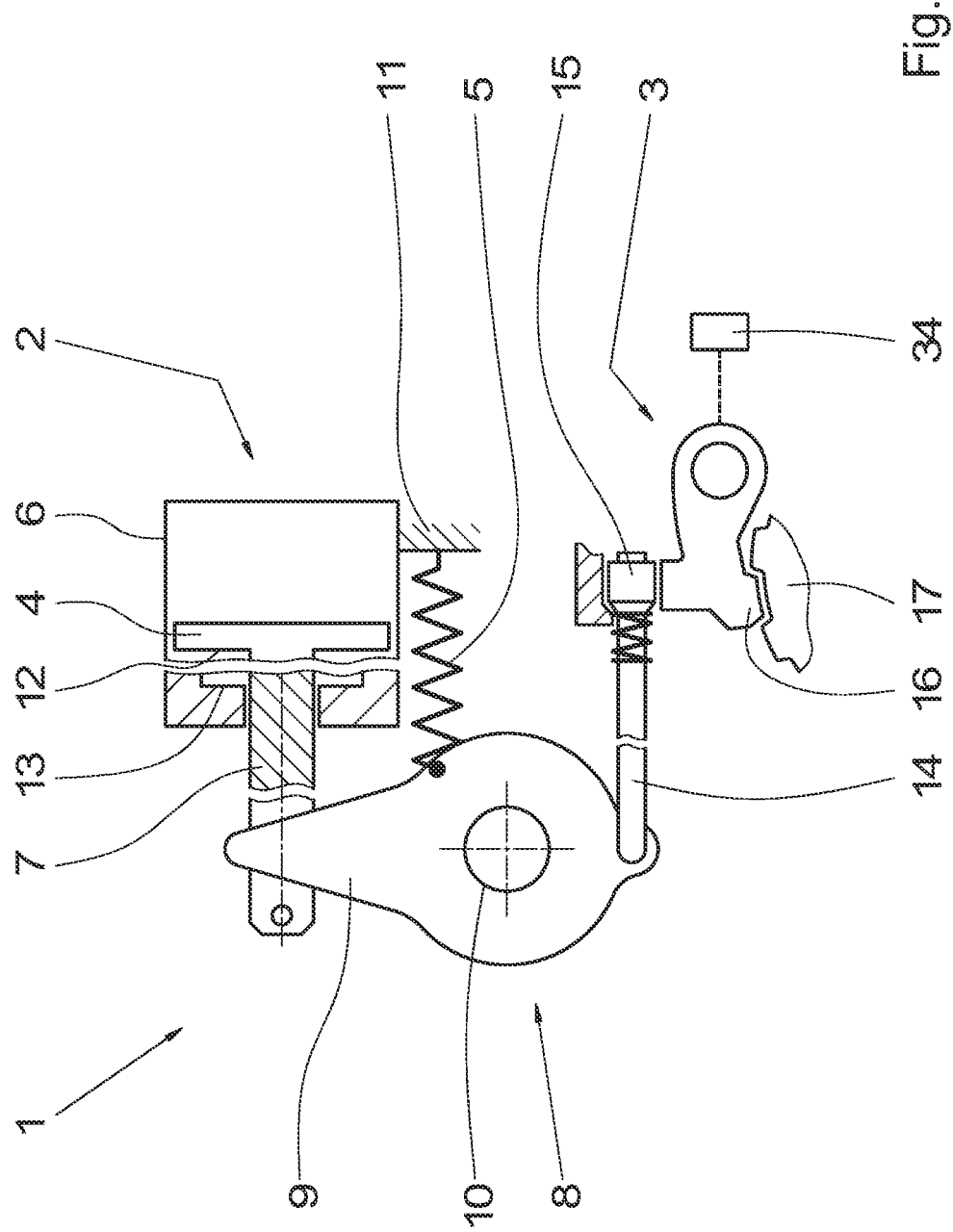

DEVICE FOR LOCKING A PISTON ROD OF A PISTON OF AN ACTUATOR WHICH IS PRESSURIZABLE IN ORDER TO DISENGAGE A PARKING LOCK AND IS SPRING-LOADED IN ORDER TO ENGAGE THE PARKING LOCK

CROSS-REFERENCE TO RELATED APPLICATION

The present application is related and has right of priority to German Patent Application No. 10 2019 218 981.4 filed on Dec. 5, 2019, which is incorporated by reference in its entirety for all purposes.

FIELD OF THE INVENTION

The invention relates generally to a device for locking a piston rod of a piston of an actuator, which is pressurizable in order to disengage a parking lock and is spring-loaded in order to engage the parking lock.

BACKGROUND

In practical applications, devices including actuators, which are provided for actuating units, are utilized in many areas. For this purpose, the actuators can each be transferred at least into two different operating conditions. Moreover, as is known, the actuators can also be locked and/or held in the operating conditions with the aid of locking units. In order to avoid an undesirable exit of the operating conditions of the actuators, the locking units can be interlocked, with the aid of electrically actuatable interlocking units, in a condition locking the actuator as well as in a condition releasing the actuator.

Known passenger car automatic transmissions/automatic transmissions often encompass a parking lock system, with the aid of which a drive train of a vehicle can be fixed or released, as demanded. A parking lock of a parking lock system of this type is usually hydraulically disengaged and is engaged with the aid of a spring accumulator. In order to be able to hold a parking lock of this type in defined positions, a parking lock system of this type includes a locking mechanism. A locking mechanism of this type offers the possibility of holding a parking lock in the demanded operating condition with little input of power and of avoiding safety-critical operating conditions. Moreover, a desired redundancy can be implemented and a vehicle availability can be ensured with the aid of a locking mechanism of this type.

With respect to the locking and release of an actuator provided for actuating a parking lock, a multitude of various mechanisms, which provide a positive engagement for the purpose of locking, is known from practical experience. The positive engagement is implemented, for example, with the aid of ball stops, detent hooks, pins, and the like. Spring units and/or electromagnets are also often utilized for actuating the locking and release.

In a multitude of parking lock systems, the parking lock is disengaged in the hydraulically pressurized condition of a non-interlocked piston, which is spring-loaded in the engagement direction of the parking lock. In the non-pressurized condition of the piston, the parking lock is engaged, when the piston is not interlocked, with the aid of the spring unit resting against the parking lock.

In one further known parking lock system, in the energized condition of an electromagnet, the actuator is locked with the aid of a detent hook exclusively in the disengaged condition of the parking lock. It is additionally provided in this case that the piston is appropriately hydraulically actuated in the direction of the disengaged operation condition of the parking lock and against the spring force of a spring unit active at the piston in the direction of the engaged operating condition of the parking lock. If the supply voltage of the electromagnet fails in the disengaged condition of the parking lock, the parking lock undesirably transitions into the engaged operating condition when the piston is in the non-pressurized condition. Moreover, the parking lock is disengaged when the piston is pressurized in the event of a fault.

Therefore, this parking lock system includes no redundant mechanical protection for a remote start of a vehicle, during which a vehicle is started by a driver with the aid of a remote ignition key or with the aid of a radio remote control, without the driver being located in the vehicle. Thereupon, in the event of a fault, the driver cannot secure the started vehicle against rolling away by actuating the service brake. Therefore, the redundant protection against an undesirable engagement or disengagement of the parking lock is provided in the area of the hydraulic system, which, however, is structurally complex and generates high production costs.

Moreover, a parking lock system is known, in which the actuator is locked in the disengaged operating condition of the parking lock and in the energized condition of the electromagnet. In the event of a loss of the supply voltage, the disengaged parking lock transitions into the engaged operating condition due to a spring unit active at the non-pressurized piston in the direction of the engaged condition. In the engaged operating condition of the parking lock, the actuator is not locked. Therefore, a redundant mechanical protection against an undesirable disengagement of the parking lock—which, in the event of a fault, is caused by an undesirable pressurization of the piston—is not possible during a remote start. In this parking lock system, the redundancy is to be provided in the area of the hydraulics, which, however, is complex and generates high production costs.

Additionally, one further parking lock system is known, in which the actuator or the parking lock actuator is locked exclusively in the engaged condition of the parking lock when an electromagnet is in the energized condition. In the disengaged condition of the parking lock, no locking of the actuator is provided. In order to avoid an undesirable actuation of the parking lock, a permanent pressurization of the piston of the actuator is necessary in the disengaged condition of the parking lock. During a remote start, the electromagnet is to be energized in the engaged condition of the parking lock. The voltage necessary therefor is often not available during a remote start.

Some of the above-described parking lock systems can lock the actuator of a parking lock system in a non-energized condition, which is favorable with respect to energy, but, in the case of a voltage loss in the area of an automatic transmission, do not have the possibility to engage the parking lock in the non-energized condition of the electromagnet and, thereupon, lock the actuator. This means, the parking lock either unintentionally remains in the disengaged condition or transitions into the engaged condition, in which, however, the parking lock cannot be locked.

The actuator of one further parking lock system is locked in the engaged operating condition as well as in the disengaged operating condition of the parking lock in the non-energized condition of an electromagnet of an interlocking unit. This means, the actuator is released via an appropriate energization of a coil of the electromagnet, in order to be able to engage or disengage the parking lock. In the case of a failure of the supply voltage, the parking lock remains in a present operating condition due to the locked condition of the actuator. Therefore, the engaged parking lock can be disengaged only by appropriately energizing the interlocking unit, whereby a vehicle cannot be towed in the event of a fault, for example. In addition, in the case of a failure of a power supply or in the case of a loss of the supply voltage of the parking lock system, the parking lock cannot be engaged and, therefore, a vehicle cannot be secured against rolling away, which is undesirable and possibly also critical to safety.

An inversion of the latter-described logic results in a parking lock system, in which the parking lock or the associated actuator, energized in the disengaged condition of the parking lock, can be locked. These types of parking lock systems are not remote start-capable, however, since their actuators can be locked only in the energized condition of the electromagnet when the parking lock is in the engaged condition. It is to be assumed, however, that the supply voltage of the electromagnet collapses during a remote start and an energization of the locking mechanism cannot be ensured. In order to nevertheless be able to actuate the parking lock to the desired extent, complex technical measures are to be provided in the area of the hydraulic supply of the actuator.

SUMMARY OF THE INVENTION

Example aspects of the present invention provide an improved device for locking a piston rod of a piston of an actuator, which is pressurizable in order to disengage a parking lock and is spring-loaded in order to engage the parking lock.

The device according to example aspects of the invention for locking a piston rod of a piston of an actuator, which is pressurizable in order to disengage a parking lock and is spring-loaded in order to engage the parking lock, includes an electrically actuatable electromagnet. An armature rod of the electromagnet is designed to be axially longitudinally movable against the spring force of a first preloading spring. Moreover, two actuating elements are axially displaceably mounted on the armature rod between two stops of the armature rod. A second preloading spring is axially mounted between the two actuating elements.

The actuating element close to the magnet includes an actuating contour facing the electromagnet, which is associated with a first latching mechanism. With the aid of the first latching mechanism, the piston can is mechanically fixable in the disengaged condition of the parking lock. The actuating element remote from the magnet includes an actuating contour facing away from the electromagnet, which is associated with a second latching mechanism, with the aid of which the piston is mechanically fixable in the engaged condition of the parking lock.

Both latching mechanisms are centrally arranged within the piston and interlocking elements of both latching mechanisms are accommodated in a housing-affixed component in an axially fixed manner. The interlocking elements of the latching mechanisms are radially displaceable with respect to the component and can be brought into engagement or out of the engagement with the piston by the particular associated actuating contour.

The components of the device according to example aspects of the invention are coordinated with each other with regard to their geometry and with regard to the forces acting upon each of them.

The coordination is such that the actuating contour remote from the magnet blocks a movement of the interlocking elements of the associated latching mechanism in the engaged condition of the parking lock and in the non-energized condition of the electromagnet, and releases a movement of the interlocking elements in the energized condition of the electromagnet. Moreover, the coordination is such that the actuating contour close to or proximate the magnet blocks a movement of the interlocking elements of the associated latching mechanism in the disengaged condition of the parking lock and in the energized condition of the electromagnet, and releases a movement of the interlocking elements in the disengaged condition of the parking lock and in the non-energized condition of the electromagnet.

With respect to the present parking lock design according to example aspects of the invention, the parking lock is locked in the disengaged condition and in the energized condition of an interlocking unit, which includes the latching mechanisms, the armature rod, and the electromagnet, as well as in the engaged condition and in the non-energized condition of the interlocking unit.

Moreover, the parking lock having the parking lock design provided according to example aspects of the invention is released in the engaged condition and in the energized condition of the interlocking unit and is released in the disengaged condition and in the non-energized condition of the interlocking unit.

Therefore, a locking concept dependent on the condition of the parking lock or a hybrid parking lock unit is made available, which meets the requirements described in greater detail in the following.

A remote start of a prime mover of a vehicle, whose output shaft can be interlocked or held with the aid of the parking lock, is possible without an electrical power supply of the electromagnet of the interlocking unit, since the parking lock is held locked in the engaged condition in the non-energized condition of the interlocking unit.

Moreover, safety-critical situations of a vehicle designed including the parking lock system according to example aspects of the invention are also given in an absence of the voltage supply of the transmission or in the case of a failure of the supply voltage of the interlocking unit, since the parking lock is released in the disengaged condition if the interlocking unit and/or the electromagnet is in the non-energized condition.

In addition, a changeover is possible starting from the disengaged condition of the parking lock into the engaged condition as compared to known parking lock systems without energization of the locking unit as well as a subsequent locking of the parking lock in the engaged condition. Therefore, in the event of a fault, an undesirable disengagement of the parking lock is prevented in a simple way.

Additionally, the parking lock, in the disengaged condition, can be held locked by the interlocking unit and secured against an undesirable engagement of the parking lock with the aid of a small amount of electrical energy.

The locking of the parking lock is deactivatable in the engaged condition in a simple way by energizing the coil of the electromagnet of the interlocking unit and, therefore, is disengageable as demanded.

In the case of an embodiment of the device according to example aspects of the invention, which can be operated with little outlay for open-loop and closed-loop control, the components are coordinated with each other with respect to their geometry and with respect to the forces acting upon each of the components in such a way that, in the non-energized condition of the electromagnet and in the engaged condition of the parking lock, the armature rod and the actuating element remote from the magnet are held in defined axial positions by the preloading springs. Thereupon, the device has an operating condition, in which the interlocking elements of the latching mechanism, which are associated with the actuating element remote from the magnet, engage into the piston and block an axial actuating movement of the piston.

In the case of a further embodiment of the device according to example aspects of the invention, which can be operated with little outlay for open-loop and closed-loop control, the components are coordinated with each other with respect to their geometry and with respect to the forces acting upon each of them in such a way that, in the energized condition of the electromagnet and in the engaged condition of the parking lock, the armature rod and the actuating element close to the magnet are held in defined axial positions by the electromagnet counter to the preloading springs. Thereupon, the device has an operating condition, in which the interlocking elements of the latching mechanism, which are associated with the actuating element close to the magnet, can be guided out of the engagement with the piston and release a movement of the piston.

The components can be coordinated with each other with respect to their geometry and with respect to the forces acting upon each of them in such a way that, in the non-energized condition of the electromagnet and in the disengaged condition of the parking lock, the armature rod and the actuating element close to the magnet are held in defined axial positions by the preloading springs. As a result, the device is transferable into and held in an operating condition, in which the interlocking elements of the latching mechanism, which are associated with the actuating element close to the magnet, can be guided out of the engagement with the piston and release a movement of the piston.

The components can be coordinated with each other with respect to their geometry and with respect to the forces acting upon each of them in such a way that, in the energized condition of the electromagnet and in the disengaged condition of the parking lock, the armature rod and the actuating element close to the magnet are held in defined axial positions by the electromagnet counter to the preloading springs. Thereupon, an operating condition of the device can be represented, in which the interlocking elements of the latching mechanism, which are associated with the actuating element close to the magnet, are engaged with the piston and block a movement of the piston.

In a structurally simple and installation space-favorable refinement of the device according to example aspects of the invention, the interlocking elements of the latching mechanisms each engage, in a latching manner, into a radial inner groove of the piston.

In a further embodiment of the device according to example aspects of the invention, which is structurally simply designed and requires little installation space in the radial direction, the first preloading spring is arranged between an annular collar of the armature rod and a housing-affixed component.

If the annular collar is also a stop of the actuating element close to the magnet, on the armature rod, the device has a structurally simple configuration and is also easy to install.

In a structurally simple embodiment of the device according to example aspects of the invention, which can be operated with little risk of jamming, the actuating contours are designed at least approximately in the shape of a truncated cone, at least partially or in sections. Moreover, base points of the actuating contours can each have the smallest outer diameters of the actuating contours and the outer diameters of the actuating contours can each constantly increase, at least in areas, starting from the base points, as the axial distance from the base points increases.

In a structurally simple refinement of the device according to example aspects of the invention, the latching mechanisms are designed as ball stops, which include balls as interlocking elements.

It can be provided that both ball stops are centrally arranged within the piston. Balls of both ball stops can be accommodated in an axially fixed manner in the component designed as a housing-affixed sleeve. Additionally, it is then possible that the balls of the ball stops are radially displaceable with respect to the sleeve and can be brought into engagement or out of the engagement with the piston by way of rolling at the particular associated actuating contour.

The interlocking elements of the latching mechanisms can also be designed as spring arms, whose first ends are fixed on the housing side and whose second ends can each be swiveled with respect to the first ends by way of the actuating contours and, as a result, can be brought into engagement with the piston in a form-locking manner or out of the engagement with the piston. These types of spring arms are known, for example, from EP 1 960 701 B1, which is incorporated by reference herein in its entirety.

A preferred embodiment of the device according to example aspects of the invention includes the two locking contours on the movable armature rod, a coil of the electromagnet for actuating the armature rod, the piston or the parking lock piston for engaging and disengaging the parking lock, and the locking mechanism including the ball stops, the sleeve, and the radial inner groove. The two locking contours are provided for locking the piston in the engaged condition and in the disengaged condition of the parking lock. Moreover, the device in this example embodiment includes the spring that is associated with the armature rod and, therefore, the locking mechanism, as well as the spring that transfers the piston into the position that corresponds to the engaged condition of the parking lock.

Moreover, in this example embodiment of the device, it is provided that the parking lock is disengaged against the spring force of the spring unit, which is mounted at the piston, when an appropriate hydraulic pressure is applied at the released piston.

A preferred embodiment of the device according to example aspects of the invention includes the axially movable armature rod, the coil of the electromagnet for actuating the armature rod, the piston or the parking lock piston for engaging and disengaging the parking lock, and a locking mechanism including two locking areas, in order to be able to fix the parking lock, in a locked manner, in the engaged condition as well as in the disengaged condition. The locking mechanism includes the two preloading springs and the spring unit for the parking lock mechanism. The parking lock can be hydraulically disengaged and can be engaged with the aid of the preloaded spring unit.

Moreover, this example embodiment is formed including the two actuating elements or locking contours, which are separated from each other on the movable armature rod geometrically and variably with respect to each other. The locking contours are designed in opposite directions with respect to each other, whereby one of the preferably tapered actuating contours in each case can block the piston in the particular condition of the parking lock. In the engaged condition of the parking lock, the two preloading springs guide the actuating elements into defined axial positions and balls of the particular associated ball stop into the engagement with the piston. Thereupon, the engaged parking lock is locked in a non-energized condition.

When the coil is energized, the piston can be released in the engaged condition of the parking lock, wherein, for this purpose, the armature rod is transferred into a defined axial position, in which the armature rod preferably rests against a mechanical stop. Simultaneously, the preloading spring is compressed and preloaded between the locking cones. Thereafter, the parking lock piston can be hydraulically disengaged. The energization of the locking coil is maintained during the disengagement of the parking lock and thereafter. As soon as the piston is in the axial position that corresponds with the disengaged condition of the parking lock, the preloaded preloading spring between the actuating elements presses balls of the particular ball stop into the inner groove of the piston. In the latter operating condition of the device, the parking lock is locked, energized in the disengaged condition.

The invention is not limited to the specified combination of features of the independent claim or the claims dependent thereon. In addition, individual features can be combined with one another, provided they arise from the claims, the description of embodiments that follows, or directly from the drawing. References in the claims to the drawings via the use of reference signs is not intended to limit the scope of protection of the claims.

BRIEF DESCRIPTION OF THE DRAWINGS

Multiple exemplary embodiments of the invention are explained in greater detail with reference to the drawings, without being limited thereto.

Wherein:

FIG. 1 shows a highly schematicized partial representation of a parking lock system of an automatic transmission.

DETAILED DESCRIPTION

Figure 2A:
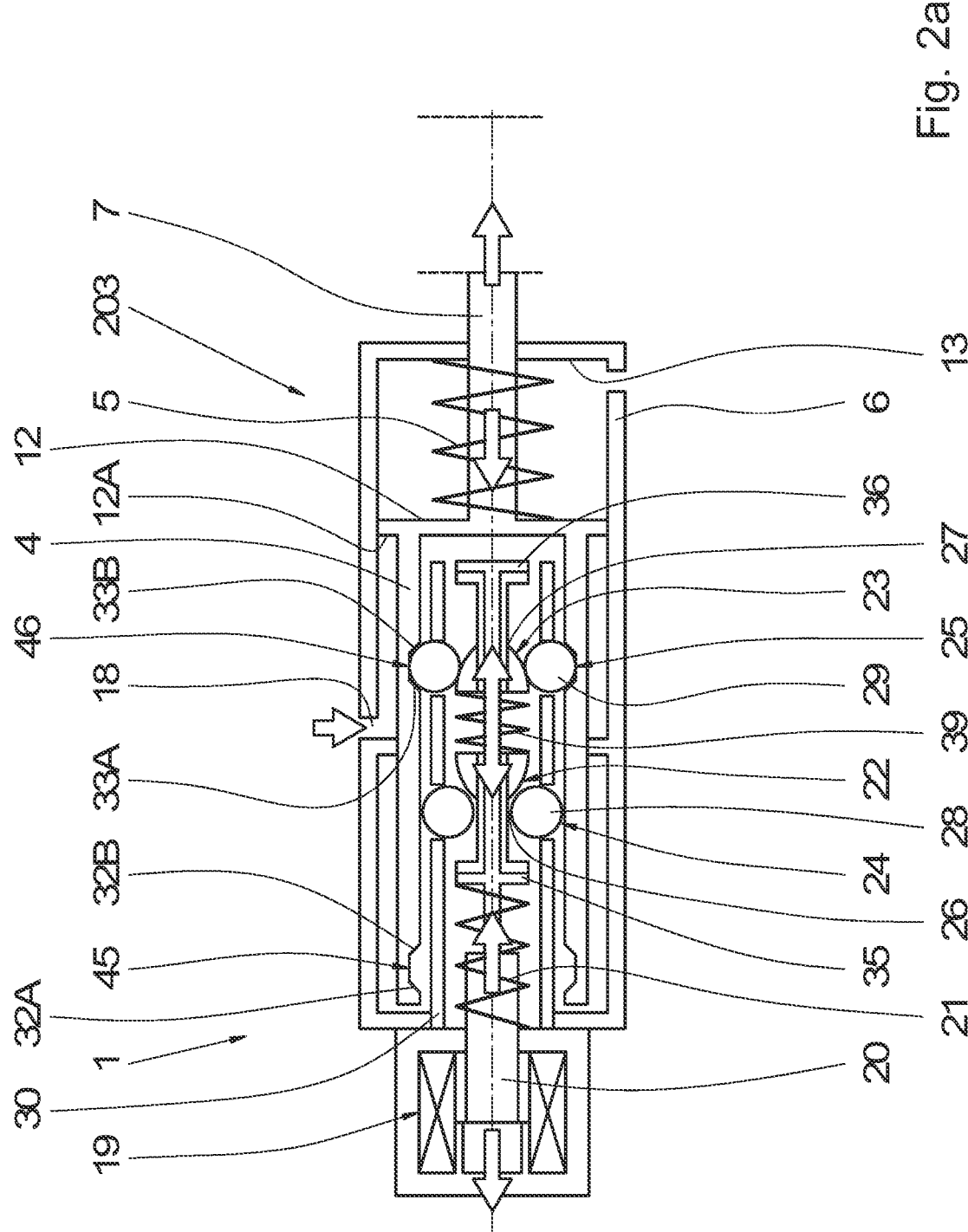
FIG. 2a to FIG. 2e show an enlarged view of a device for actuating a parking lock of the parking lock system according to FIG. 1 in various operating conditions.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

A schematic part longitudinal cutaway view of a parking lock system 1 known from practical experience, including a device 2 for actuating a parking lock 3, is represented in FIG. 1. The device 2 includes an actuator, which includes a piston 4, which can be acted upon by fluid. The piston 4 is actuatable in the opening direction or in the direction of a disengaged condition of the parking lock 3, depending on the particular applied fluid pressure, counter to a spring unit 5 acting in the closing direction or an engaged condition of the parking lock 3. For this purpose, the piston 4 is arranged, displaceably in the axial direction, in a cylinder 6 of the actuator. Additionally, the piston 4 is connected to a deflecting mechanism 8 via a piston rod 7. In the present case, the deflecting mechanism 8 includes a rotary disk 9, which is designed to be rotatable in the area of a pin 10. The spring unit 5 is designed as a compression spring in the present case and is connected at one end to the rotary disk 9. At the other end, the spring unit is supported in the area of a housing 11.

Moreover, the rotary disk 9 is operatively connected to a parking interlock rod 14, which is coupled to a parking interlock cone 15. The parking interlock cone 15 cooperates with a parking pawl 16. The parking pawl 16 is engageable, via an axial movement of the piston 4, with a parking interlock gear 17, which is rotationally fixed to an output shaft of a vehicle drive train, in order to rotationally fix the output shaft. If the parking pawl 16 is guided out of the engagement with the parking interlock gear 17 via an axial movement of the piston 4 in the opposite direction, the parking lock 3 is disengaged and the output shaft can rotate.

A device 203 represented in FIG. 2a through FIG. 2e for actuating the parking lock 3 has the same functionality as the device 2 in each case. Therefore, the same reference numbers are used in the description and in the drawing for structurally and functionally identical components of the devices 2 and 203.

With respect to the device 203 for actuating the parking lock 3, the spring unit 5 is arranged between an end face 12 of the piston 4 and an inner side 13 of the cylinder 6 facing the end face 12 of the piston 4. The spring unit 5 is designed as a compression spring in each case, in order to be able to engage the parking lock 3 in the non-pressurized condition of the piston 4.

The device 203 includes a piston 4, which is longitudinally movably arranged in a cylinder 6. The piston 4 can be acted upon by hydraulic fluid in the area of an end face 12A starting from a hydraulic port 18 and counter to the spring force of a spring unit 5. At an appropriate pressure, a piston rod 7 is transferable out of the position shown in FIG. 2a, which corresponds to the engaged condition of the parking lock 3, into the position shown in FIG. 2e, in which the parking lock 3 is disengaged.

Two actuating elements 37 and 38 of a locking unit are axially displaceably mounted on an armature rod 20 of an interlocking unit, between two stops 35 and 36 of the armature rod 20. A further preloading spring 39 is mounted between the two actuating elements 37 and 38.

The actuating element 37 proximate or close to the magnet includes an actuating contour 22 facing an electromagnet 19 of the interlocking unit, which is associated with a latching mechanism 24 of the locking unit designed as a ball stop. With the aid of the ball stop 24, the piston 4 is mechanically fixable in the disengaged condition of the parking lock 3. Additionally, the actuating element 38 remote from the magnet includes an actuating contour 23 facing away from the electromagnet 19, which is associated with a further latching mechanism 25 designed as a ball stop. With the aid of the further ball stop 25, the piston 4 is mechanically fixable in the engaged condition of the parking lock 3.

Both ball stops 24 and 25 are centrally arranged within the piston 4. Interlocking elements 28 and 29 of the ball stops 24 and 25, which are designed as balls, are accommodated in an axially fixed manner in a component 30 designed as a housing-affixed sleeve, wherein axial movements of the balls 28, 29 are largely prevented by the sleeve 30. The balls 28 and 29 are each radially displaceable with respect to the sleeve 30 and can be brought into engagement or out of the engagement with the piston 4 by way of rolling at the particular associated actuating contour 22 and 23, respectively.

The components of the device 203 are coordinated with each other with respect to their geometry and with respect to the forces acting upon each of the components in such a way that, in the engaged condition of the parking lock 3, the actuating contour 23 remote from the magnet or the actuating element 38 remote from the magnet blocks a radial movement of the balls 29 of the associated ball stop 25 in the non-energized condition of the electromagnet 19 and releases the radial movement in the energized condition of the electromagnet 19. Moreover, the coordination is such that, in the disengaged condition of the parking lock 3, the actuating contour 22 of the actuating element 37 close to the magnet blocks a radial movement of the balls 28 of the associated ball stop 24 in the energized condition of the electromagnet 19 and releases the radial movement in the non-energized condition of the electromagnet 19.

The piston 4, the armature rod 20, and the two actuating elements 37 and 38 have the axial positions shown in FIG. 2*a* in the non-energized condition of the electromagnet 19 as well as in the engaged condition of the parking lock 3. Thereupon, the balls 29 of the ball stop 25 are pushed radially outward by the actuating element 38 remote from the magnet, through the sleeve 30, into a radial inner groove 46 of the piston. Thereupon, the piston 4 is locked with respect to the cylinder 6 and is axially fixed. This means, the piston 4 cannot be displaced either by the spring unit 5 in the direction of the engaged condition of the parking lock 3 or by the hydraulic pressure applied via the hydraulic port 18 in the direction of the disengaged operating condition of the parking lock 3. In this operating condition of the device 203, the actuating element 38 remote from the magnet rests against the stop 36, while the actuating element 37 close to the magnet is pressed against the stop 35 by the further preloading spring 39.

In the presence of a demand to disengage the parking lock 3, the electromagnet 19 is energized. Due to the magnetic force of the electromagnet 19, which is then applied at the armature rod 20, the armature rod 20 is pulled, counter to the spring force of the preloading spring 21, in the direction of the electromagnet 19 and is transferred into the axial position shown in FIG. 2*b*. Since the actuating element 37 close to the magnet rests against the radially non-displaceable balls 28 of the ball stop 24, the stop 35 lifts off of the actuating element 37. Simultaneously, the actuating element 38 is axially displaced, together with the armature rod 20, in the direction of the electromagnet 19 by the stop 36. As a result, the further preloading spring 39 is compressed and preloaded between the two actuating elements 37 and 38.

Figure 2B:
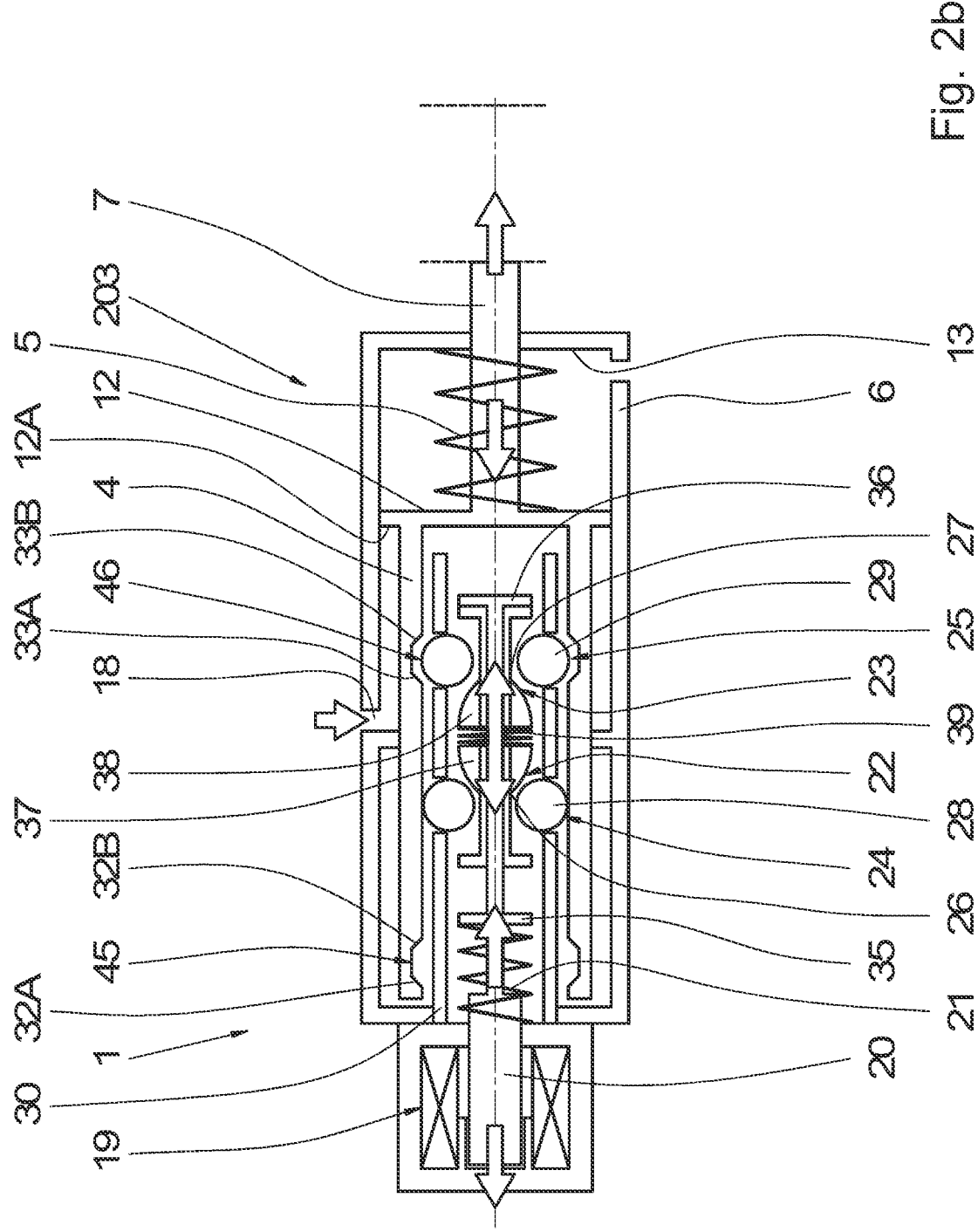
Figure 2C:
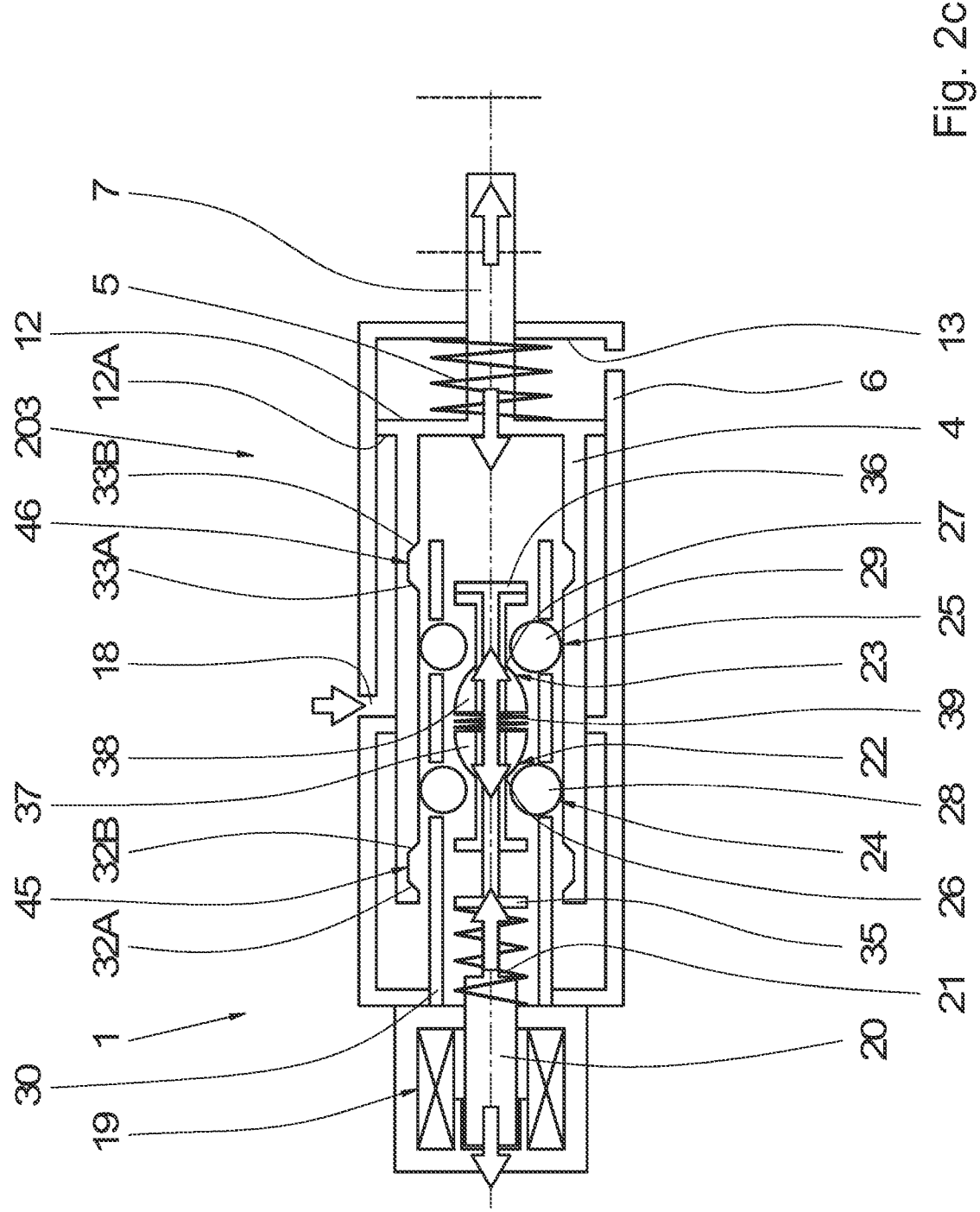

In the axial position of the actuating element 38 remote from the magnet shown in FIG. 2*b*, the balls 29 are displaceable radially inward with respect to the sleeve 30 and, therefore, brought out of the engagement with the radial inner groove 46 of the piston 4. This means, in the energized condition of the electromagnet 19 and in the engaged condition of the parking lock 3, the ball stop 25 the piston 4 releases an axial actuating movement of the piston 4 directed away from the electromagnet 19.

The piston 4 carries out an actuating movement of this type when the hydraulic pressure applied via the hydraulic port 18 or the actuating force resulting therefrom and active at the piston 4 in the direction of the disengaged condition of the parking lock 3 is greater than the spring force of the spring unit 5. If this is the case, the piston 4 is transferred against the spring force of the spring unit 5 out of the axial position shown in FIG. 2*b* into the axial position shown in FIG. 2*c*, wherein, as a result, the disengagement of the parking lock 3 is started.

Figure 2D:
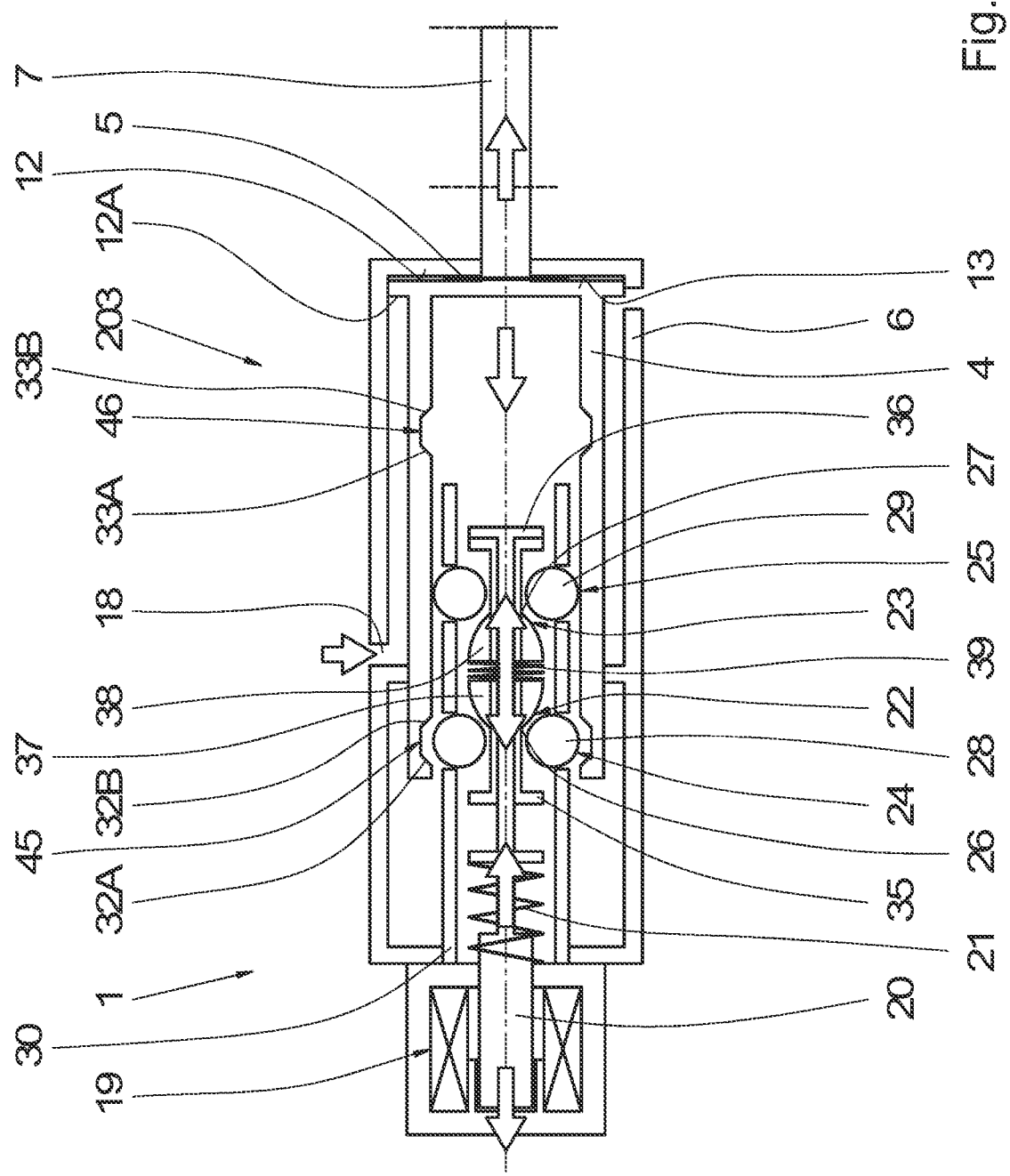
Figure 2E:
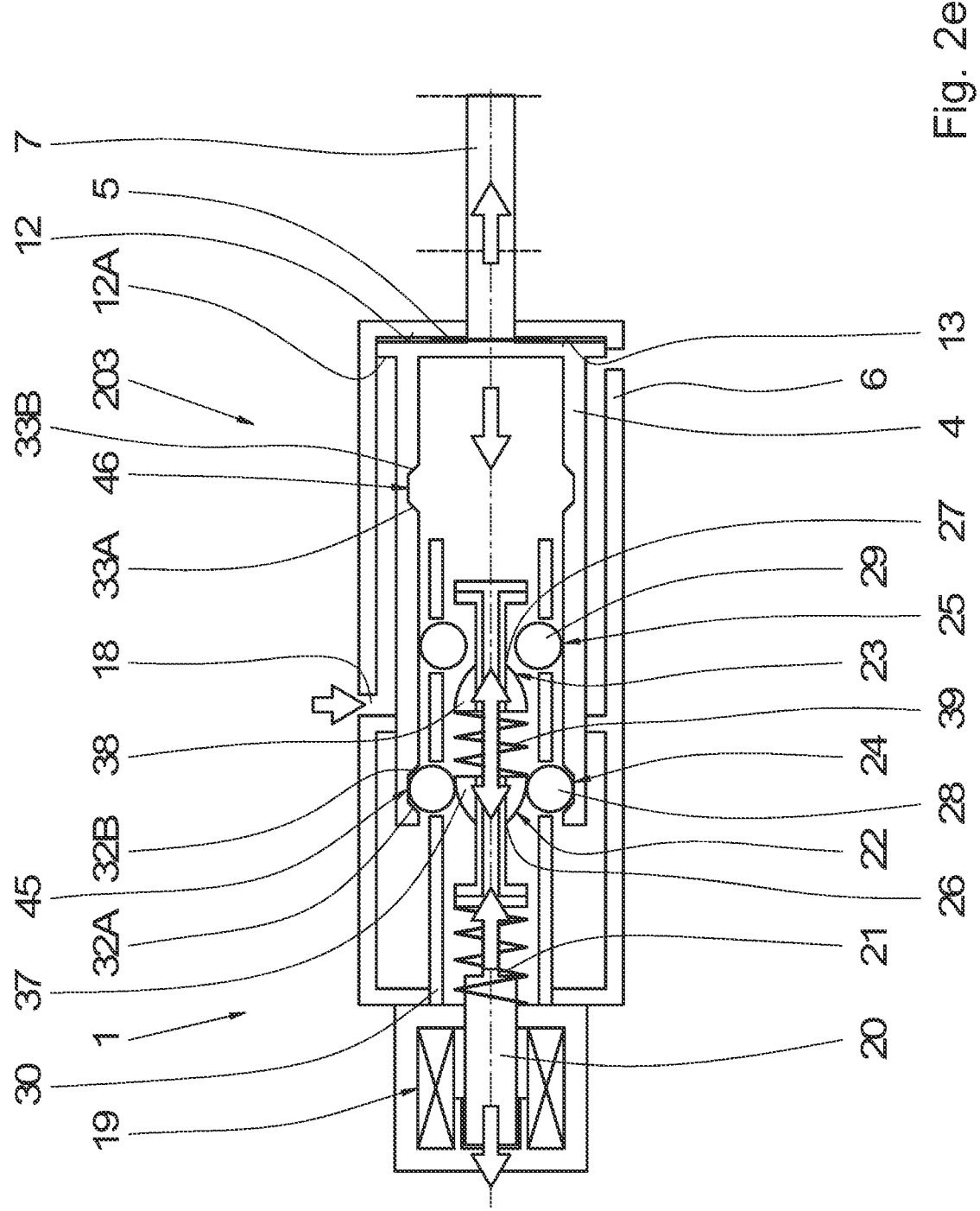

If the piston 4 is further displaced in the axial direction, the axial distance between the electromagnet 19 and the piston 4, as well as the piston rod 7 connected thereto, increases until the piston 4 has the axial position shown in FIG. 2*d*. The latter-described axial position of the piston 4 corresponds to the disengaged operating condition of the parking lock 3. In this position of the piston 4, a further radial inner groove 45 of the piston 4 is in overlap with the balls 28 of the ball stop 24. In this position of the piston 4, the balls 28 are guidable outwardly in the radial direction through the sleeve 30 into the radial inner groove 46 and, therefore, are engaged with the piston 4. This condition is shown in FIG. 2*e*.

In the process, the balls 28 are pushed radially outward by the preloaded further preloading spring 39, which displaces the actuating element 37 close to the magnet in the direction of the stop 35, and the piston 4 as well as the piston rod 7 are locked or latched to the desired extent with the aid of the ball stop 24 close to the magnet. As a result, an undesirable engagement of the parking lock 3 is prevented in the energized condition of the electromagnet 19.

If there is an appropriate demand to engage the parking lock 3, the energization of the electromagnet 19 is switched off. As a result, the armature rod 20, together with the actuating elements 37 and 38, are axially displaced by the preloading spring 21 away from the electromagnet 19. The stiffness constants of the preloading springs 21 and 39 are matched to each other in such a way that a base point 26 of the actuating contour 22 of the actuating element 37 close to the magnet is then arranged underneath the balls 28 of the ball stop 24 and the balls 28 are guidable radially inward out of the engagement with the radial inner groove 45.

Therefore, the piston 4 is released in the disengaged operating condition of the parking lock 3 and in the non-energized condition of the electromagnet 19. The parking lock 3 is transferable into the engaged operating condition by the spring unit 5 when an appropriate hydraulic pressure is present in the area of the hydraulic port 18. Thereafter, the ball stop 25 latches the piston 4 to the extent represented in FIG. 2*a*, in order to avoid an undesirable disengagement of the parking lock 3.

The radial inner grooves 45 and 46 are designed including lateral surfaces 32A, 33A and 32B, 33B, which are pitched with respect to the radial direction. Via the beveled lateral surfaces 32A, 33A and 32B, 33B of the radial inner grooves 45, 46, an undesirable misalignment or jamming of the ball stops 24 and 25 is prevented in a simple way.

Moreover, it is also possible to design the latching mechanisms of the locking unit not including the interlocking elements designed as balls, but rather including interlocking elements designed as spring arms. The spring arms are swivelably operatively connected to the cylinder 6 and preferably include a hook-like end. Interlocking elements of this type are known, for example, from EP 1 960 701 B1 and are swivelable radially outward with the aid of the actuating contours 22 and 23, in order to prevent an actuating movement of the piston 4 or, in the swiveled-in condition, to release the piston 4.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 parking lock system
2 device
3 parking lock
4 piston
5 spring unit
6 cylinder
7 piston rod
8 deflecting mechanism
9 rotary disk
10 pin
11 housing
12 end face of the piston
12A further end face of the piston
13 inner side of the cylinder
14 parking interlock rod
15 parking interlock cone
16 parking pawl
17 parking interlock gear
18 hydraulic port
19 electromagnet
20 armature rod
21 preloading spring
22 actuating contour
23 actuating contour
24 latching mechanism, ball stop
25 latching mechanism, ball stop
26 base point of the actuating contour 22
27 base point of the actuating contour 23
28 interlocking element, ball of the ball stop 24
29 interlocking element, ball of the ball stop 25
30 sleeve
32A to 33B lateral surfaces of the radial inner grooves 45 and 46
34 sensor
35 annular collar, stop
36 stop
37 actuating element
38 actuating element
39 further preloading spring
45 radial inner groove
46 radial inner groove

The invention claimed is:

1. A device (2; 203) for locking a piston rod (7) of a piston (4) of an actuator, which is pressurizable in order to disengage a parking lock (3), the device (2; 203) comprising:
an electrically actuatable electromagnet (19) with an armature rod (20) that is axially movable against a spring force of a first preloading spring (21);
two actuating elements (37, 38) axially displaceably mounted on the armature rod (20) axially between two stops (35, 36) of the armature rod (20); and
a second preloading spring (39) axially mounted between the two actuating elements (37, 38),
wherein the actuating element (37) positioned proximate the electromagnet (19) comprises an actuating contour (22) facing the electromagnet (19), the actuating contour (22) of the actuating element (37) positioned proximate the electromagnet (19) associated with a first latching mechanism (24), the piston (4) mechanically fixable in a disengaged condition of the parking lock (3) with the first latching mechanism (24),
wherein the actuating element (38) positioned remote from the electromagnet (19) comprises an actuating contour (23) facing away from the electromagnet (19), the actuating element (38) positioned remote from the electromagnet (19) associated with a second latching mechanism (25), the piston (4) mechanically fixable in an engaged condition of the parking lock (3) with the second latching mechanism (25),
wherein both of the first and second latching mechanisms (24, 25) are centrally arranged within the piston (4), interlocking elements (28, 29) of the first and second latching mechanisms (24, 25) are disposed in a housing-affixed component (30) in an axially fixed manner, and the interlocking elements (28, 29) are radially displaceable with respect to the component (30) and selectively engageable with the piston (4) by a respective actuating contour (22, 23),
wherein components of the device (2; 203) are coordinated with respect to geometry and with respect to forces acting upon each of the components such that
the actuating contour (23) facing away from the electromagnet (19) blocks movement of the interlocking elements (29) of the second latching mechanism (25) when the parking lock (3) is in the engaged condition of the parking lock (3) and the electromagnet (19) is in a non-energized condition of the electromagnet (19),
the actuating contour (23) facing away from the electromagnet (19) releases the interlocking elements (29) of the second latching mechanism (25) for movement when the electromagnet (19) is in an energized condition of the electromagnet (19),
the actuating contour (22) facing the electromagnet (19) blocks movement of the interlocking elements (28) of the first latching mechanism (24) when the parking lock (3) is in the disengaged condition of the parking lock (3) and the electromagnet (19) is in the energized condition of the electromagnet (19), and
the actuating contour (22) facing the electromagnet (19) releases the interlocking elements (28) of the first latching mechanism (24) for movement when the electromagnet (19) is in the non-energized condition of the electromagnet (19).

2. The device of claim 1, wherein the components of the device (2; 203) are coordinated with respect to the geometry and with respect to the forces acting upon each of the components such that, when the electromagnet (19) is in the non-energized condition of the electromagnet (19) and the parking lock (3) is in the engaged condition of the parking lock (3), the first and second preloading springs (21, 39) hold the armature rod (20) and the actuating element (38) positioned remote from the electromagnet (19) in axial positions at which the interlocking elements (29) of the second latching mechanism (25) at least partially engage into the piston (4) and block movement of the piston (4).

3. The device of claim 1, wherein the components of the device (2; 203) are coordinated with respect to the geometry and with respect to the forces acting upon each of the components such that, when the electromagnet (19) is in the energized condition of the electromagnet (19) and the parking lock (3) is in the engaged condition of the parking lock (3), the electromagnet (19) holds the armature rod (20) and the actuating element (38) positioned remote from the electromagnet (19) counter to the first and second preloading springs (21, 39) in axial positions at which the interlocking elements (29) of the second latching mechanism (25) are guidable out of engagement with the piston (4) to release the piston (4) for movement.

4. The device of claim 1, wherein the components of the device (2; 203) are coordinated with respect to the geometry and with respect to the forces acting upon each of the components such that, when the electromagnet (19) is in the non-energized condition of the electromagnet (19) and the parking lock (3) is in the disengaged condition of the parking lock (3), the first and second preloading springs (21, 39) hold the armature rod (20) and the actuating element (37) positioned proximate the electromagnet (19) in axial positions at which the interlocking elements (28) of the first latching mechanism (24) are guidable out of engagement with the piston (4) to release the piston (4) for movement.

5. The device of claim 1, wherein the components of the device (2; 203) are coordinated with respect to the geometry and with respect to the forces acting upon each of the components such that, when the electromagnet (19) is in the energized condition of the electromagnet (19) and the parking lock (3) is in the disengaged condition of the parking lock (3), the electromagnet (19) holds the armature rod (20) and the actuating element (37) positioned proximate the electromagnet (19) counter to the first and second preloading springs (21, 39) in axial positions at which the interlocking elements (28) of the first latching mechanism (24) at least partially engage into the piston (4) and block movement of the piston (4).

6. The device of claim 1, wherein the interlocking elements (28, 29) of the first and second latching mechanisms (24, 25) each respectively engage into a radial inner groove (45, 46) of the piston (4) in a latching manner.

7. The device of claim 1, wherein the first preloading spring (21) is arranged between an annular collar (35) of the armature rod (20) and the housing-affixed component.

8. The device of claim 7, wherein the annular collar (35) is a stop of the actuating element (37) positioned proximate the electromagnet (19) on the armature rod (20).

9. The device of claim 1, wherein the first and second latching mechanisms (24, 25) are each configured as a ball stop and comprise balls as the interlocking elements (28, 29).

10. The device of claim 9, wherein:
the ball stops (24, 25) are centrally arranged within the piston (4);
the balls (28, 29) of both ball stops (24, 25) are accommodated in an axially fixed manner in the housing-affixed component (30);
the housing-affixed component (30) is configured as a sleeve; and
the balls (28, 29) of the ball stops (24, 25) are radially displaceable with respect to the sleeve (30) and are selectively engageable with the piston (4) by way of rolling at the respective actuating contour (22, 23).

11. The device of claim 1, wherein:
the interlocking elements are configured as spring arms;
first ends of the spring arms are fixed on the housing side; and
second ends of the spring arms are each swivelable relative to a respective first end by way of the actuating contours and, as a result, are selectively engageable with the piston in a form-locking manner.

* * * * *